United States Patent

Hill

[11] 4,121,146
[45] Oct. 17, 1978

[54] BATTERY CHARGING SYSTEMS FOR ROAD VEHICLES

[75] Inventor: William Frank Hill, Stafford, England

[73] Assignee: Lucas Industries Limited, Birmingham, England

[21] Appl. No.: 773,271

[22] Filed: Mar. 1, 1977

[30] Foreign Application Priority Data

Mar. 3, 1976 [GB] United Kingdom ............... 8422/76

[51] Int. Cl.² ............................................. H02J 7/14
[52] U.S. Cl. ..................................... 320/48; 320/64; 322/99
[58] Field of Search ............... 322/28, 99; 320/48, 320/64

[56] References Cited

U.S. PATENT DOCUMENTS

| | | | |
|---|---|---|---|
| 3,890,555 | 6/1975 | Nelson et al. ............... | 320/2 |
| 3,944,905 | 3/1976 | Allport et al. ............... | 322/99 X |
| 4,056,765 | 11/1977 | Scheidler et al. ............... | 322/99 X |

OTHER PUBLICATIONS

"Voltage Monitor Uses LED Indicators . . .," Moss, Electronic Design 19, 9/13/74, p. 176.

*Primary Examiner*—Robert J. Hickey
*Attorney, Agent, or Firm*—Holman & Stern

[57] ABSTRACT

A battery charging system includes an alternator, a main rectifier for charging the battery, and an auxiliary rectifier for supplying current to the alternator field winding under control of its voltage regulator 20. A first transistor switch is sensitive to under voltage to illuminate a first warning light and a second transistor switch is sensitive to over voltage to illuminate a second warning light. The two transistor switches are cross-connected so that failure of either light causes illumination of the other.

7 Claims, 1 Drawing Figure

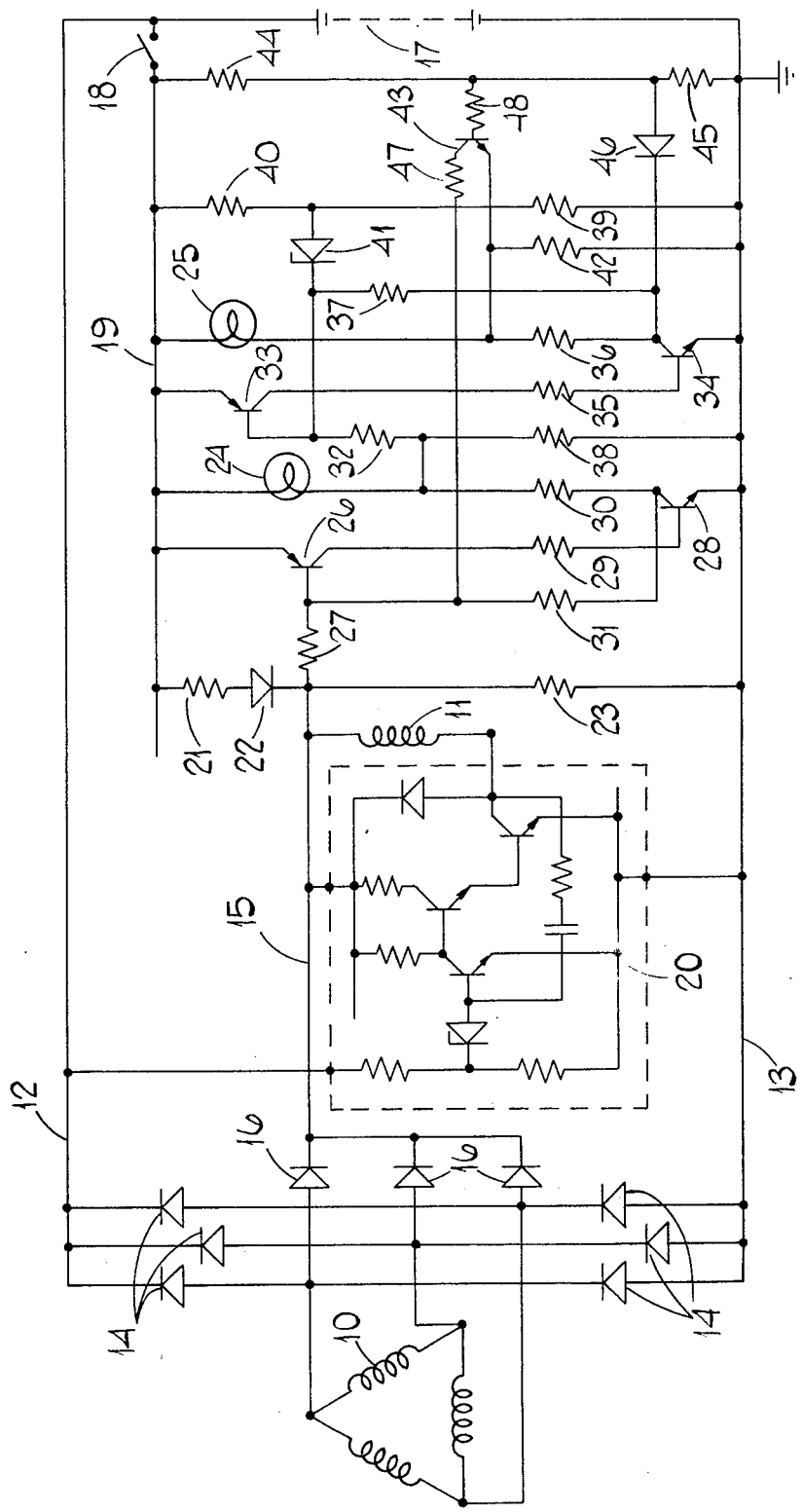

BATTERY CHARGING SYSTEMS FOR ROAD VEHICLES

This invention relates to battery charging systems for road vehicles and has particular reference to the provision in a vehicle battery charging system of a warning light arrangement intended to warn the driver of the vehicle of malfunction of the system.

Conventionally a single warning light is provided which is intended to indicate when no output is being obtained from the charging system. One known form of charging system utilises an alternator with a main full wave rectifier for charging the battery and an auxiliary rectifier for supplying current to the field winding of the alternator under the control of a voltage rectifier. In such a system it is convenient to connect a warning lamp and a switch in series between one side of the main rectifier and the auxiliary rectifier. On starting of the engine the warning lamp is energised by current flowing through it from the vehicle battery to the field winding. When the alternator becomes self-energising there is no voltage drop across the lamp which is thus extinguished.

Such a system has several shortcomings such as the inability of the warning lamp to indicate a fault which results in an over voltage, or a fault which results from an open circuit field winding. Furthermore, failure of the lamp itself while the engine is running will not be detected until the engine is next started and any failure which occurs whilst the engine is still running cannot be indicated.

It is an object of the invention to provide a battery charging system of the general kind referred to with a warning lamp arrangement in a convenient form which overcomes at least some of the shortcomings of the conventional arrangement described above.

A battery charging system in accordance with the invention comprises an alternator having an armature and a field winding, a full wave rectifier connecting the armature to first and second supply lines for connection to the battery to be charged, an auxiliary rectifier connecting the armature to a third supply line which is at substantially the same voltage as the first supply line when the alternator is running, a voltage regulator circuit by means of which the field winding is connected between the second and third supply lines, a switch connecting the first line to a further supply line, a resistor and a diode connected in series between the further and third supply lines, said diode conducting when the voltage on the third supply line is lower than that on the further line, a current path of high impedance (relative to the impedance of said resistor) interconnecting the second and third supply lines, a first warning lamp, means sensitive to the voltage between the further and third supply lines for illuminating the first warning lamp when said diode conducts, a second warning lamp, means sensitve to the voltage drop across said first warning lamp for illuminating the second warning lamp when said voltage drop across the first warning lamp exceeds a predetermined value, an over-voltage sensing means for illuminating said second lamp when the voltage between the further and second supply lines exceed a threshold value.

Preferably, the first warning lamp is connected at one side to the further supply line and at the other side to the second line by a second resistor of value adequate to prevent illumination by the current which flows through the lamp and said second resistor in series.

Furthermore, the second lamp may be connected at one side to the further supply line and at the other side through a third resistor of suitably high value to prevent illumination of the second lamp to the second supply line, means sensitive to the voltage drop through said third resistor being provided for illuminating the first warning lamp in the event of failure of the second warning lamp, independently of illumination of the first warning lamp.

An example of the invention is shown in the accompanying drawing which is a circuit diagram of a battery charging system with a warning lamp arrangement.

The system shown includes a three-phase alternator with an armature 10 and a field winding 11. The alternator is connected to first and second supply lines 12, 13 by a full wave rectifier consisting of six diodes 14 and also to a third supply line 15 by an auxiliary rectifier consisting of three diodes 16. A battery 17 is connected between the lines 12 and 13 and the vehicle ignition switch 18 connects the first line 12 to a further supply line 19 which is connected in turn to various ignition switch controlled loads (not shown). The current through the field winding 11 is controlled by a known voltage regulator 20, which senses the voltage between the first and second lines. The field winding is connected in series with the output stage of the voltage regulator between the third and second supply rails.

The line 19 is connected to the line 15 by a resistor 21 and a diode 22 in series with the cathode of the diode 22 connected to the line 15. When the ignition switch is closed and the engine which drives the alternator is not running the resistor 21 provides field current, the output stage of the voltage regulator being switched hard on in these circumstances. A resistor 23 of relatively high impedance as compared with that of the resistor 21 is connected between the lines 15 and 13, to pull down the voltage on the line 15 if the field winding should fail to an open circuit condition.

First and second warning lamps 24, 25 are provided for monitoring the operation of the alternator. The first lamp 24 is intended primarily to indicate undercharge conditions and the second lamp 25 to indicate over-voltage conditions, but each lamp is also used to monitor the continuity of the circuit through the other lamp.

Means are provided for illuminating the lamp 24 whenever the diode 22 conducts. Such means includes a p-n-p transistor 26 with its emitter connected to the line 19 and its base connected via a resistor 27 to the line 15. The collector of the transistor 26 is connected to the base of an n-p-n transistor 28 via a resistor 29. The emitter of the transistor 28 is connected to the line 13 and its collector is connected via a resistor 30 to one side of the lamp 24, the other side of which is connected to the line 19. A feedback resistor 31 is connected between the collector of the transistor 28 and the base of the transistor 26 to provide regenerative feedback which is adequate to provide fast switching action but inadequate to prevent the transistors 26 and 28 being switched off when the voltage on the line 15 is the same as that on the line 19.

The lamp 25 is controlled by a similar complementary transistor regenerative switch consisting of an input resistor 32, a p-n-p transistor 33, an n-p-n transistor 34, a coupling resistor 35, a resistor 36 in series with the lamp 25 and a feedback resistor 37. This switch is, however, sensitive to the voltage drop across the lamp 24, the input resistor 32 being connected to the junction of the resistor 30 and the lamp 24. A further resistor 38 is connected between this junction and the line 13 and serves to provide a voltage drop across the bulb 24 when this is open circuit (and conduct base current from the transistor 33 in these circumstances).

Means sensitive to the voltage difference between the lines 19 and 13 is provided in the form of a resistive potential divider 39, 40 connected between these lines and a zener diode 41 having its anode connected to the common point of the potential divider and its cathode connected to the base of the transistor 33. In the event of an over voltage fault the zener diode 41 breaks down and conducts base current from the transistor 33, thereby illuminating the lamp 25.

An arrangement is also provided to illuminate the lamp 24 in the event of an open circuit failure of the lamp 25. This arrangement includes a resistor 42 connected between the junction of the lamp 25 with the resistor 36 and the line 13. This junction is also connected to the emitter of an n-p-n transistor 43, the base of which is connected by a resistor 48 to the common point of a resistive potential divider 44, 45 connected between the lines 19 and 13. This common point is also connected to the anode of a diode 46, the cathode of which is connected to the collector of the transistor 34. The collector of the transistor 43 is connected by a resistor 47 to the base of the transistor 26.

When the ignition switch 18 is closed prior to starting the engine the lamp 24 illuminates as described and as a result the lamp 25 is also illuminated. Current flowing through the resistor 36 reverse biases the transistor 43 which does not switch on in these conditions. Any failure of the alternator which causes the voltage on line 15 to fall significantly below the battery voltage, when the engine is running, will similarly illuminate both lamps, base current from the transistor 26 flowing through resistor 23 (which may be shunted by the field winding and voltage regulator output stage).

In the event of an over voltage fault, as described above, the lamp 25 alone is illuminated, transistor 43 again being reverse biased.

If the lamp 24 fails, the resistor 38 causes the transistor 33 to switch on, thereby illuminating the lamp 25. Alternatively if the lamp 25 fails, the absence of current through the resistor 36 removes the reverse bias on the transistor 43 which switches on and turns the transistor 26, on illuminating the lamp 24. The resistors 38 and 42 have impedances which are high as compared with the lamp impedance so that only a small standing current, too weak to illuminate the lamps 24, 25 normally flows. For the same reason the voltage at the junction of each bulb with its series resistor is normally too high to cause transistors 33 and 43 to conduct.

The example described above thus provides adequate monitoring of the functioning of the alternator as well as being self-checking as regards lamp continuity.

In the arrangement described above the resistor 23 is used to provide a high impedance path between the rails 15 and 13 independently of the regulator 20. In many regulators however, there exist high impedance paths between these rails which are effective even when the field winding 11 has failed to open circuit condition (one such path existing, for example, through the collector emitter of the driver transistor and the base emitter of the output transistor in the case shown). Where such a path exists the resistor 23 may be omitted, although it is preferably present as shown.

I claim:
1. A battery charging system for a road vehicle, comprising an alternator having an armature and a field winding, first, second and third supply lines, a further supply line, a full wave rectifier connecting the armature to first and second supply lines for connection to the battery to be charged, an auxiliary rectifier connecting the armature to a third supply line which is at substantially the same voltage as the first supply line when the alternator is running, a voltage regulator circuit by means of which the field winding is connected between the second and third supply lines, a switch connecting the first line to a further supply line, a resistor and a diode connected in series between the further and third supply lines, said diode conducting when the voltage on the third supply line is lower than that on the further line, a current path of high impedance relative to the impedance of said resistor interconnecting the second and third supply lines, a first warning lamp, means sensitive to the voltage between the further and third supply lines for illuminating the first warning lamp, means sensitive to the voltage drop across said first warning lamp for illuminating the second warning lamp when said voltage drop across the first warning lamp exceeds a predetermined value, and an over-voltage sensing means for illuminating said second lamp when the voltage between the further and second supply lines exceed a threshold value.

2. A battery charging system as claimed in claim 1 further comprising a second resistor connecting on side of the first warning lamp to said second supply line, the other side of said first warning lamp being connected to the further supply line, said second resistor being of adequate ohmic value to prevent illumination of the first warning lamp by current therethrough.

3. A battery charging system as claimed in claim 1 further comprising a third resistor connecting one side of the second warning lamp to the second supply line, the other side of said second warning lamp being connected to said further supply line and the ohmic value of said third resistor being adequate to prevent illumination of said second warning lamp and means sensitive to the voltage drop across the third resistor for illuminating the first warning lamp on failure of the second warning lamp.

4. A battery charging system as claimed in claim 1 in which said means sensitive to the voltage between the further and third supply lines comprises a transistor having its base emitter path connected across said lines.

5. A battery charging system as claimed in claim 4 in which said transistor is the input transistor of a pair of transistors connected as a regenerative switch, the output transistor of said pair of transistors controlling current flow through said first warning lamp.

6. A battery charging system as claimed in claim 1 in which the overvoltage sensing means comprises a resistive potential divider connected between said further supply line and said second supply line a zener diode connected at one side to a point in said potential divider and a transistor controlling the current through said second warning lamp and having its base connected to the other side of said zener diode.

7. A battery charging system as claimed in claim 6 in which said transistor is the input transistor of a pair of resistors connected as a regenerative switch, the output transistor controlling the current through said second lamp.

* * * * *